United States Patent
Mingus

[19]

[11] Patent Number: 5,843,549
[45] Date of Patent: Dec. 1, 1998

[54] LABEL LAMINATE AND NOVEL PAPER SUBSTRATE THEREFOR

[75] Inventor: Scott Mingus, Perry, Ohio

[73] Assignee: Avery Dennison Corporation, Pasadena, Calif.

[21] Appl. No.: 682,820

[22] Filed: Jul. 12, 1996

[51] Int. Cl.⁶ ...................................................... B32B 7/00
[52] U.S. Cl. ........................ 428/40.1; 283/81; 428/41.4; 428/41.7; 428/41.8; 428/217; 428/218; 428/219; 428/914
[58] Field of Search ................................ 428/40.1, 41.4, 428/418, 217, 218, 219, 914, 41.7; 283/81

[56] References Cited

U.S. PATENT DOCUMENTS 5,165,976  11/1992  Newing et al. ........................ 428/40.1
5,318,815   6/1994  Newing et al. ........................ 438/40.1

Primary Examiner—Nasser Ahmad
Attorney, Agent, or Firm—Renner, Otto, Boisselle & Sklar

[57] ABSTRACT

The release liner of a paper label laminate is made with a porous, inexpensive, low weight paper substrate. The paper substrate is selected to substantially match the label facestock in terms of hysterisis curves. In addition, chemical techniques rather than supercalendering or heavy clay coating are relied on for achieving the desired silicone holdout and silicone cure properties of the paper substrate.

15 Claims, 1 Drawing Sheet

LABEL LAMINATE AND NOVEL PAPER SUBSTRATE THEREFOR

BACKGROUND OF THE INVENTION

The present invention relates to a label laminate, i.e. a laminate useful in forming pressure sensitive and heat sensitive labels. In addition, the present invention also relates to a release liner particularly useful in forming such laminates as well as a paper backing or substrate especially useful in forming such release liners.

Pressure sensitive labels are typically made from a bulk roll of laminate composed of a continuous label layer and a release liner. The label layer is made from a facestock such as paper plus an adhesive, while the release liner is composed of a paper substrate or backing provided with an agent facilitating release of the label in a subsequent label-applying operation.

In order to make individual labels from such laminates, the label facestock is first printed with label information. Then, the laminate is die cut through the facestock and adhesive to the surface of the release liner to form discrete labels carried on the release liner. The matrix surrounding the individual labels, that is the portion of the facestock layer not forming part of the individual labels, may then withdrawn thereby leaving multiple, discrete labels carried on the release liner. The individual labels are then removed either by hand or by an automatic label applying operation. In some instances, bulk laminate rolls are subdivided into individual laminate sheets prior to one or more of the foregoing label-forming steps.

Two important properties of modern label laminates are silicone cure and silicone holdout. Silicone cure refers to the ability of the applied silicone release agent to cure properly when in contact with the chemicals present on the surface of the paper substrate. Silicone holdout refers to the resistance of the paper substrate to penetration by the liquid silicone release agent before it cures. If the release agent does not cure properly, or if too much release agent penetrates into the body of the paper substrate, the cured release layer separating the paper substrate from the label adhesive will not work properly. As a result, the labels may be held on the release liner too loosely or too tightly to function properly in further processing steps.

Another important property of a label laminate is its lay flat characteristics. In many applications, it is desirable that the label laminate remain essentially flat when it is placed on a supporting surface, either by itself or in stacks. However, most label commercially-available laminates tend to bow or curl when subjected to significant changes in ambient conditions. For example, some laminates curl when subjected to increases or decreases in humidity. Others curl when heated to high temperatures as experienced, for example, in certain laser printers. Other label laminates curl when mechanically stressed, which can occur for example during subsequent label-making and label applying steps.

Attempts to make label laminates exhibiting excellent layflat, silicone holdout and silicone cure characteristics have already been undertaken. Typically, these efforts seek to achieve good layflat characteristics by matching, as much as possible, the papers of the facestock and substrate in terms of their response to changes in ambient humidity. In practice, this means that the paper used to form the substrate is usually relatively heavy or dense (e.g. basis weight of 40 pounds per 3000 ft$^2$ ream or more), since these are the types of paper which tend to match typical facestocks in terms of hygroscopicity.

Achieving good silicone cure and good silicone holdout in papers of this type have centered a number of different approaches. In one approach the paper is provided with a heavy (i.e. 10 pounds per ream) coating of clay or analogue. In another approach, the paper is subjected to supercalendering, i.e. multiple calendering steps using alternating steel and cotton calender rolls for extensive processing and polishing of the paper surface. In still another approach, the paper is subjected to soft nip calendering (in-line supercalendering in the paper machine using calendar rolls with soft, deformable surfaces).

Although label laminates exhibiting good combinations of layflat, silicone holdout and silicone cure characteristics can be produced by the above procedures, the laminates obtained are comparatively expensive. This is due in part to the use of paper substrates which are heavy and hence comparatively expensive. This is also due to the heavy clay coating, supercalendering or soft nip calendering steps necessary for imparting appropriate silicone cure and silicone holdout characteristics to the substrate paper.

Accordingly, there is a need for a new label laminate which exhibits good layflat, silicone cure and silicone holdout characteristics, but which also can be made more easily and inexpensively than by current practice.

SUMMARY OF THE INVENTION

In accordance with the present invention, it has been discovered that a label laminate having the desired combination of silicone cure, silicone holdout and layflat properties can be produced from inexpensive, low weight paper substrates provided that the paper forming the substrate exhibits a precise combination of properties, as more fully described below.

In particular, it has been found possible to form the substrate of a label laminate with a paper which not only substantially matches most commonly used facestock papers in terms of hysterisis curves but which is also porous and low weight. Accordingly, it is possible to provide a laminate which exhibits little curl in response to changes in humidity even though the paper backing layer of the laminate is made from an inexpensive material.

At the same time, it has also been found that the heavy clay coating or supercalendering steps used in prior art attempts to provide good silicone cure and silicone holdout characteristics can also be avoided by suitable selection of the properties of the porous, low weight paper forming the paper substrate of the inventive laminate. Accordingly, the additional expense of heavy clay coating, supercalendering or soft nip calendering can be totally avoided in producing the label laminate of the present invention.

Accordingly, the present invention provides a new label laminate which not only resists curling in response to heat, humidity and elongation better than conventional label laminates available today, but also is less expensive to produce than conventional product.

DETAILED DESCRIPTION

Figure 1:
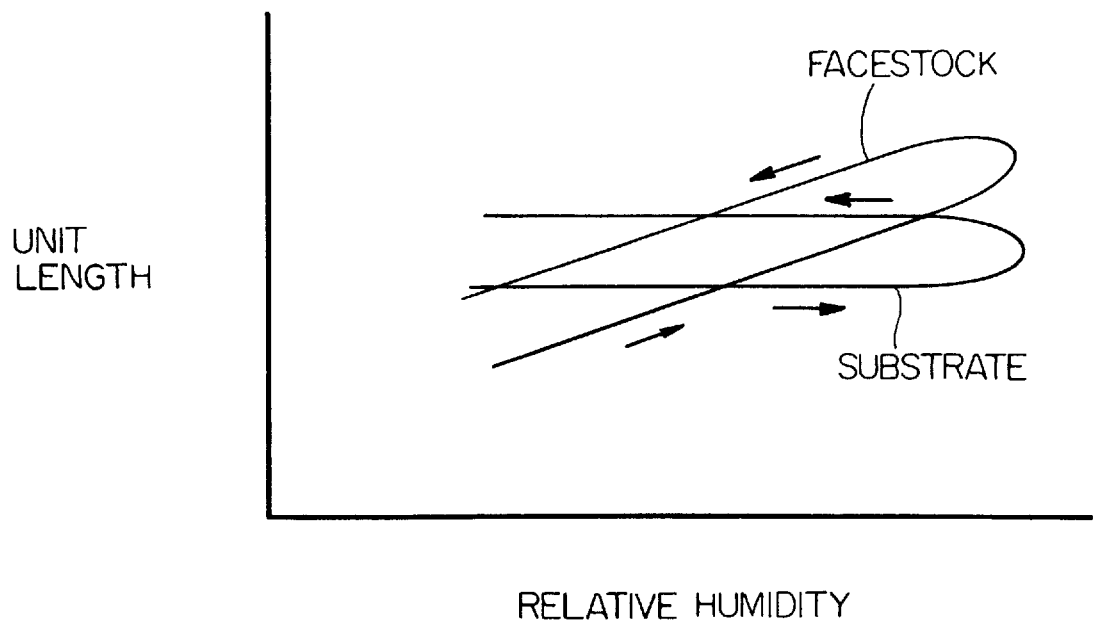
FIG. 1 is a graph illustrating the hysterisis curves of a paper backing and a facestock used to form a label laminate.

In accordance with the present invention, a new label laminate is provided, the label laminate including a release liner made from a paper backing or substrate having a combination of properties within the ranges of about the following:

|  | General | Preferred |
|---|---|---|
| Water Cobb Size Test, gm/m² | 15–27 | 20–23 |
| Neenah Hygroexpansivity | <5% | 0–2% |
| IGT Silicone Demand at 40 kg, cm³/cm² (dimethylpolysiloxane at 250 centipoise) | <6 | <5.5 |
| Percent Extractables in Silicone Coating* | <10% | 3–6% |
| Apparent Density, lbs/mil/ream | 11.5–17 | 12–15 |
| Heat Stability, % shrinkage | <0.5% | <0.05% |

*Determined after application of silicone release agent.

More preferred papers for use as substrates in the inventive label laminate exhibit the following additional properties:

|  | General | Preferred |
|---|---|---|
| IGT Penetration, cm | 6–12 | 7–10 |
| Deflection, % | <15 | <3 |
| Tensile Stiffness Orientation, % | <5 | <3 |
| Backside Coefficient of Friction | 0.3–0.8 | 0.5–0.6 |
| Liner Stiffness, mg |  |  |
| Machine Direction | 100–200 | 130–170 |
| Transverse Direction | 40–80 | 50–65 |
| Caliper, mils | 2.0–4.0 | 2.75 ± 0.1 |

Especially preferred papers exhibit still additional properties as follows:

|  | General | Preferred |
|---|---|---|
| Contact Angle, dynes | 90–180 | 100–130 |
| Parker Print Surface, μ | >3 | 4.0–5.5 |
| Squareness (MD/TD Ratio) | 2 to 1 | 1.5 to 1 |
| % Elongation Under Stress, machine dir. | 0.5–2% | 0.5–1% |
| Tensile Energy Absorption, kg · m/m² | 5–15 | 7–10 |

Each of the foregoing properties is known in the papermaking industry. In general, these properties can be described as follows:

Water Cobb Size Test is measure of the manner in which the backing paper absorbs water. It is determined by measuring the volumetric take-up of water by a given sheet of paper using the "Cobb Size Test," an industry recognized test (test method #T432, om-94 from the Technical Association of the Pulp and Paper Industry, "TAPPI"). A given amount of water is applied to paper in a Cobb Size Test apparatus for a set period of time, after which the water is poured off. By comparing the weight of the wet paper to that of the dry weight before wetting, the amount of water absorbed may be calculated in gm/m². If a backing paper has a Cobb Size value above 25 gm/m², water absorbency is too great, and the resultant fiber swelling has a negative impact on curl resistance. In addition, high water absorbency has a direct negative impact on silicone holdout, particularly with emulsion-based silicone systems. With too low a Cobb value, papers tend to react more slowly to changes in relative humidity and may not be in balance with the hygroexpansivity of the facestocks used for layflat constructions.

Neenah Hygroexpansivity is a measure of the tendency of the backing paper to expand or contract in response to certain conditions of ambient humidity. This test described, for example, in numerous articles in the TAPPI Journal, the official magazine of the Technical Association of the Pulp & Paper Industry, as well as in Useful Method #549. Paper fibers tend to swell and expand when exposed to increasing humidity, and conversely shrink or contract under declining humidities. In this test, the length of a strip of paper is measured at 50% RH at 21° C. after 24 hours exposure. Humidity is then cycled from 50% to 75–80%, back to 50%, then to 20–25%, and finally back to 50% a third time. Expansion and contraction of the paper strips is then plotted versus humidity for samples under high tension and low tension. By comparing the slope and shape of these curves, as well as their amplitude, papers used for the label stock and for the release liner may be matched. If the backing paper has too much response in comparison to the paper or film facestock, curl towards the facestock may result as humidities are increased. If the liner or backing paper has too little response, curl towards the liner side of the laminate may result at the construction is subjected to environmental changes.

IGT Silicone Demand is one way of determining silicone holdout. IGT Silicone Demand is basically a measure of the ability of a paper to resist penetration by a given liquid such as silicone polymer at different pressures. It is determined by use of pendulum device known as the Institute for Graphic Technology Tester, or IGT Tester. In this test, paper strips are wrapped around a cylinder attached to the pendulum arm. Under a given pressure, the two cylinders are brought together forming a nip. The free end of the strip on the base unit is then wetted with a solution (in this case, dimethylpolysiloxane polymer having a viscosity of 250 centipoise). Immediately, the pendulum is released, and the liquid is spread between the two paper strips as the pendulum falls. Through a series of calculations provided with the test instrument, the volumetric amount of fluid needed to cover a set area can be generated. If the Silicone Demand value is too high, the release liner will often exhibit higher than desired release force (the force required to separate the labelstock and adhesive from the siliconized backing paper). High release force may cause other unwanted effects, including label curl upon removal from the liner, inadequate die-cutting and stripping of individual labels, and poor dispensing in automatic applications. Generally, papers made with low sizing, or with rough surfaces will require either additional silicones to cover their surface, special silicone polymers of higher molecular weight, or pre-treatments at the paper mill (heavy coatings of clay and other materials that may have negative impacts on the ability of the silicone to cross-link or cure). Papers with very low Silicone Demand will often have excellent silicone holdout properties, but may show poor adhesion of the cured polymeric layer to the paper surface. Incidentally, it should be appreciated that, if the release agent used to form the inventive label liner and laminate is not a silicone resin, then the IGT Silicone Demand Test is used in the same way as described above to determine the demand for this other release agent in lieu of the silicone resin normally used for this purpose.

Percent Extractables is a measure of the extent that an applied silicone release agent has cured. In this test, which is carried out after the desired silicone release agent is applied to the paper substrate and cured, atomic absorption spectroscopy is used to determine the portion of the silicon atoms in the cured silicone resin which remain unreacted. High extractables indicate that the silicone has been undercured, and reactive silicone remains on the paper surface. This is commonly the case with papers that use clay as a surface holdout coating. Poorly cured silicones result in higher release force, improper label adhesion, improper quick stick and often to lower adhesion of the pressure-sensitive adhesive (untreated silicone may migrate to transfer to the surface of the adhesive, reducing its ability to adhere to a substrate). The lower the extractables, the better the silicone cure.

Apparent Density, which gives a good indication of the compressibility of the paper, is a measure of the weight of the paper per unit volume, specifically the weight of a ream of the paper 1 mil thick. It cane easily be determined by dividing the basis weight of the paper (in pounds per ream) by the average caliper or thickness. Papers made with low refining or little calendering and no supercalendering are "spongy," and have a low amount of fiber mass per unit of thickness. During the label making operation, the die or tooling used to cut individual labels is contacted with a hard steel backup or anvil roll, which acts as a hard surface to cut against. The clearance between the die edges and the backup roll is fixed depending upon the caliper of the release liner. As the die contacts the pressure-sensitive laminate, the backing paper acts in concert with the anvil roll to serve as a cutting surface. The die cuts through the face paper and adhesive, and slightly compresses the backing paper before rebounding and withdrawing from the laminate to cut the next label. The compressibility of the backing paper is a crucial element in successfully executing a clean die-cut. In the pressure-sensitive industry, supercalendered kraft papers are often utilized as the release liner as they compress very little under the pressure of the die strike, yielding a clean, sharp die cut. However, these papers are prone to curling dramatically as humidities change. Although lower apparent density papers often have less curl, they exhibit other properties which may be undesirable if the foregoing guidelines are not observed. For example, if Apparent Density is too low, this backing paper will typically compress under the die load, and the die will not cleanly cut through the adhesive, resulting in waste matrix breaks. In some cases, papers with too high an apparent density have been known to fracture and break apart under the stress of the die-cutting operation.

Heat Stability represents the resistance of the paper to shrinkage upon heating to elevated temperature. Heat Stability can be easily determined by subjecting a test sheet, such as a standard 8-½×11" sheet of the paper, to 400° F. for 1 second and then determining the amount of shrinkage in the longitudinal direction. A paper which shrinks by more than about ½% may cause a laminate made therefrom to curl when the laminate is heated to high temperatures, for example, in laser and other types of printers.

IGT Penetration is a well known test in the paper industry which is also useful in determining silicone holdout. Basically, IGT Penetration is a measure of the ability of a paper to resist penetration by N-butyl phthalate, a traditional component of inks. IGT Penetration is determined by a test method similar to IGT Silicone Demand using the same IGT device as previously described. In this case, the backing pressure and the composition of the backing cylinder is changed, and the holdout characteristics of the paper can be determined by spreading a drop of n-butyl phthalate of specific volume on the surface of the backing paper. The length of the resultant stain on the paper is measured and reported as IGT Penetration, or varnishability. Papers with too high of an IGT Penetration may exhibit performance problems in silicone coating, such as poor wettability resulting in an erratic coverage pattern. If IGT Penetration is too low, again special silicone formulations or high coat weights must be used to achieve suitable release characteristics.

Deflection, which is also a good indicator of compressibility, relates to the decrease in thickness of the paper upon the application of a standard load. Deflection can be easily determined by measuring the decrease in thickness of a paper sample after a 100 gram weight having a paper-contacting surface area of 1 $cm^2$ is placed on the paper for 5 seconds and then removed. If Deflection is too great, then the paper will compress too much under the die load and labels will not be clearly cut (similar to the Apparent Density test). If Deflection is too low, then again, the release liner may be prone to breakage or fracture under the die.

Tensile Stiffness Orientation is a measure of the deflection from the machine direction of the average angle of the fibers in the paper. The unit of measurement is percent, with a 0° angle of deflection representing 0% and a 900 angle of deflection representing 100%. Tensile Stiffness can be easily determined by using an ultrasonic device which measures the orientation of individual paper fibers versus pre-set standards. An example of such an instrument is the device manufactured and sold by the Swedish company Lorentzen & Wettre under the designation "TSO Tester Code SE 150". If the angle of fiber orientation is too high or too low, then twist or diagonal curl can result (corner to corner edge lift) . It has been found that by controlling the orientation of paper fibers at the point of paper manufacturing, twist curl can be eliminated or greatly reduced.

Backside Coefficient of Friction is a measure of the coefficient of friction on the backside of the paper substrate. It can easily be determined by TAPPI test method #T549 in which a sample of the facestock or label facing paper is mounted on a fixed bedplate. The backside of the release liner is contacted with the front side of the label paper and slid across the surface in accordance with the test method. The kinetic coefficient of friction between the moving liner paper and the stationary face paper may therefore be generated. If the coefficient of friction is too high, then individual sheets of label laminate (stacked in the input tray of a laser printer for example) may not feed into the printer as desired, causing jamming or misfeeds. If the coefficient of friction is too low, double feeds may result as the sheets want to slide into the printer too quickly.

TAPPI test method #T549 for Backside Coefficient of Friction, like all other TAPPI test methods specified herein, are conducted at 50% relative humidity unless otherwise specified.

Liner Stiffness is a measure of the degree of bending of the paper in response to a stress applied in a direction normal to its surface. It can be easily determined by the Gurley Stiffness Test, as described in TAPPI test method #T543 om-94. A paper strip of known dimensions is subject to bending when contacted with a pendulum of known weight and size. The resultant force required to bend the paper until it releases the pendulum arm is measured in milligrams. Liner Stiffness impacts a number of backing paper performance characteristics, including release force and end use applicability. In the case of sheet-fed printers such as laser printers, Liner Stiffness affects the resultant laminate stiffness. If Liner Stiffness is too high, stiffer facestocks may predispense in the printer, causing jams or failure of the printer. With liner and laminate stiffness too low, jamming may result as sheets buckle or "accordion fold" in the printer.

Caliper is a measure of the thickness of the paper substrate and can be easily determined by the use of a micrometer or similar thickness gauge with specified pressures as described in TAPPI test method #T411 om-89.

The thickness of a single sheet of backing paper is measured under specified loading. Backing papers with low Caliper often run well through desktop printing units such as ink jet printers or slow speed laser printers, but may not function well in high speed, high volume industrial printing machines. Papers with too high of a Caliper work in the high speed printers, but often jam in desktop units. In addition, Caliper is a key factor in the die-cutting and stripping of individual labels. The clearance of the tooling used to cut labels from an anvil roll is set to specified Caliper or thickness of the backing paper.

Contact Angle is also useful in determining silicone holdout. Contact Angle is a measure of the angle formed by a bead of liquid, such as water or silicone, immediately upon direct contact with a paper surface as measured by a goniometer or contact angle device such as that described in TAPPI test method #T458 om-89. If the Contact Angle exceeds 180 degrees, fluid may not properly wet the surface, leaving a discontinuous film on the paper surface. With contact angles less than 90 degrees, liquid is absorbed too rapidly into the paper's surface, resulting in inadequate holdout of the silicone or water or other fluid.

Parker Print Surface is also a measure of the surface properties of the backside surface of the paper substrate. Basically, it is a measure of the average size of the peaks and valleys in the paper surface. It can be easily determined by the rate of passage of air under specified pressure across the paper surface. Rougher paper will require more air pressure as the air flow tends to mirror the surface topography of the paper, yielding a higher test reading. Smoother papers require less air pressure as their surface contour is more planar. Common tests of smoothness include the Sheffield test (described in TAPPI T 538 om-88), and the preferred Parker Print Surf test (described in TAPPI T 555 om-94). If the Parker Print Surface of the backside is less than about $4\mu$, then jamming may occur in laser printers as the backside of the stock is too smooth, impacting the coefficient of friction, as well as slipping force. Matching facestocks of high smoothness with backing papers of high smoothness often results in poor printer performance in terms of sheet dispensing into the printer. In addition, certain printers use internal devices such as "D-wheels" to advance the next sheet. Papers that are too smooth often cause the D-wheel to slip across the surface instead of gripping the paper and driving it into the printer. This results in misaligned sheets, skewing of sheets, and/or misfeeds and double feeds. Papers that are too rough may also be a problem as they cannot slide well enough against internal machine parts, slowing their rate of transport potentially causing jamming.

Squareness is a measure of the relative distribution of paper fibers in the paper. A paper having a completely random distribution of fibers will have a squareness ratio of 1, since the same amounts of fibers will be arranged in the machine and transverse directions. In most paper making processes, the majority of fibers tend to align toward the machine direction, and accordingly the squareness ratio of most papers is more than 1. The squareness ratio of a test paper can be easily approximated by dividing the machine direction tensile strength value by the transverse direction tensile strength, with the resulting ratio used as an estimate of fiber alignment. More sophisticated methods do exist to more closely analyze MD to CD fiber alignment. As paper tends to curl in response to fiber swelling (with the "valley" of the curl aligned in the machine direction, a sheet with completely random fiber alignment (squareness of 1) will not exhibit directional curl. A sheet with squareness of 2 or more (twice as many fibers aligned in the MD as in the transverse or cross direction) will often demonstrate a strong tendency to curl with the valley in the longitudinal direction.

Percent Elongation Under Stress is a measure of how much stress a paper can withstand in the machine direction without rupture or major loss in dimensional stability. It can be determined by a stress-strain curve as generated during the common paper tensile test (TAPPI test method #T-494 om-88). In this test, paper is elongated under specified load and speed until rupture occurs. A paper whose Percent Elongation is too low is likely to tear in subsequent processing operations such as printing, matrix stripping and automatic label application. A paper whose Percent Elongation is too high is likely to lose its shape during subsequent handling, which may make it unsuitable for further processing and automatic equipment.

Tensile Energy Absorption (TEA) is a measure of the ability of a paper sheet to absorb mechanical shocks. Tensile Energy Absorption can easily be determined by analyzing the relationship between stress and strain in the tensile test (TAPPI test method T494 om-88). The area under the stress-strain curve can be mathematically derived, and then factored into an equation as given in the test method to yield tensile energy absorption (T.E.A.). The higher the T.E.A. in a backing paper, the easier it is to stress the sheet without it fracturing (as in the pressure-sensitive lamination operation, or in label making operations, as well as in pin-fed laser and impact printers). Lower than desired T.E.A. has been shown to lead to web breakage when stressed, particularly in perforated, pin-fed label applications.

Although not mandatory, it is also preferable that the paper used to form the invention release liner also be of the porous, low density type, as this contributes to a substantial reduction in cost of the product label laminate. Basis weights (i.e. weight of the paper per unit area) of 50 pounds per 3000 ft$^2$ ream or less are desirable, while basis weights of 45 pounds per 3000 ft$^2$ ream or less or even 40 pounds per 3000 ft$^2$ ream or less are preferred.

The inventive label laminate is made by forming a release liner from a paper substrate having the set of properties described above and then applying an adhesive and then a face stock thereto.

To make the inventive release liner, the paper substrate or backing described above is coated with a release agent. Essentially any material which has previously been used, or is otherwise useful as, a release agent for label laminates can be used as the release agent in the present invention. Silicone release agents are preferred. As is well known, silicone release agents typically comprise liquid compositions containing curable silicone resins which form solidified silicone coatings upon curing. These compositions may include aqueous or organic liquid carriers which evaporate prior to or during the curing operation. The composition can also contain various additives and functional groups to facilitate polymerization and cross-linking, if desired.

Although any type of silicone release agent can be employed in the present invention, it is preferable to avoid those compositions containing organic solvents for environmental reasons. Accordingly, preferred release agents are those which are supplied either neat, i.e. without carrier liquid, or by means of an aqueous carrier liquid. The amount the release agent to be applied in accordance with the present invention is not critical, and essentially any conventional amount can be used.

Once the release liner of the present invention is produced, label laminates can be made therefrom in any conventional manner. Typically, this is done by coating the release layer of the release liner with the desired adhesive, such as a pressure sensitive adhesive or a heat sensitive adhesive, and then laminating a layer of facestock thereto. Preferably, the inventive label laminates are formed to have a Stiffness of 400–800 mg, preferably 500–700 mg in the machine direction and 200–600 mg, preferably 300–500 mg, in the transverse direction. Stiffness is a measure of paper flexural rigidity and can easily be determined by a common paper test known as the Gurley Stiffness Test (TAPPI Test Method T-543 om88). The facestock may be formed from materials such as synthetic resins (polymer films), aluminum, metals, metallized papers, coated-paper fluorescent-coated paper and combinations thereof plus other facestocks known to those skilled in the art. Preferably, the facestock is composed of paper and the like. For example, the facestock may be formed from the synthetic resin materials disclosed in U.S. Pat. No. 4,713,273; U.S. Pat. No. 4,888,075; U.S. Pat. No. 4,946,532; U.S. Pat. No. 5,143,570; U.S. Pat. No. 5,186,782; U.S. Pat. No. 5,242,650 and commonly assigned U.S. application Ser. No. 08/259, 301 filed Jun. 13, 1994, the disclosures of which is incorporated herein by references.

In accordance with the present invention, the facestock and paper backing layer used to form a particular label laminate are preferably selected to have a substantial hysterisis match. Even more preferably, the facestock and paper substrate are selected so that the slope of the lower sections of the hysterisis curves of the two layers are within 5% of one another. This is illustrated in FIG. 1 which is a graph illustrating, for both the facestock and substrate layers of a label laminate, the unit length of the layer as a function of relative humidity. In particular, FIG. 1 shows that, for both the facestock and the substrate, a hysterisis occurs in this relationship, i.e. the unit length of the layer at a given humidity is different depending on whether humidity is increasing or decreasing. By a "substantial match in hysterisis" is meant that the slopes of the lower portions of the two hysterisis curves, i.e. the portions of the curves relating to an increase in relative humidity, are within 5% of one another.

Because the facestock and backing layers of the inventive label laminate are matched in terms of hysterisis curves, and also because the paper substrate exhibits the indicated Neenah Hygroexpansivity, the inventive label laminate exhibits little or no curl even though subjected to widely varying humidity conditions. Similarly, because the paper substrate is selected to have the indicated Heat Stability, the inventive label laminate exhibits little or no curl when subjected to high temperature conditions such as occurs in certain laser and other printers. Also, because the paper substrate has the indicated mechanical characteristics such as Liner Stiffness and Tensile Stiffness Orientation (and preferably Percent Elongation Under Stress and Tensile Energy Absorption), laminates made therefrom can be subjected to the normal mechanical stresses encountered in subsequent processing steps without introducing mechanically-induced curl into the product. Accordingly, even though the inventive label laminates can be made from inexpensive paper substrates, they nonetheless can achieve layflat characteristics as good as and in some instances even better than conventional products.

Another advantageous feature of the inventive label laminate is that the desired silicone cure and silicone holdout characteristics of its paper substrate are achieved by relying on the chemistry of the paper rather than the mechanical means used in the past, i.e. supercalendering, soft nip calendaring or heavy clay coating.

In this regard, chemical techniques for altering the surface properties of papers, particularly silicone holdout and silicone cure characteristics, are well known to those skilled in the paper-making art. In particular, it is well known that various different curable, water-soluble and water-unsoluble natural and synthetic resins, when incorporated on the paper surface or internally into the paper body, significantly impact the surface and bulk properties of the paper including silicone holdout and silicone cure. In the same way, it is also known that certain minerals in finely divided form, when applied to paper surfaces as part of the paper-making operation, significantly impact the surface properties of the paper product. Furthermore, it is also known that such organic and mineral materials or "sizes" can be used in combinations to develop properties not achievable by single compositions alone. A particular advantage of the present invention is that the desired silicone cure and holdout characteristics are achieved using these chemical techniques rather than by the supercalendering, soft-nip calendering or heavy clay coating steps used in prior art systems. This allows the cost of producing the inventive laminate to be even further reduced, since these expensive mechanical finishing steps can be totally avoided.

Label laminates produced in accordance with the present invention can be used in a wide variety of different applications. For example, they can be used in various types of consumer printing equipment such as desktop laser printers, desktop ink jet printers and the like. In addition, they are useful in a wide variety of industrial applications such as high speed industrial printers, flash fusion printers, LED systems, magnetography systems, conventional thermal and laser system printers, industrial ink jet printers, digital printers (both wide and narrow formats), pin fed and continuous printers and the like. In addition, the inventive laminates are particularly appropriate for layflat applications, i.e. applications where layflat properties are of critical importance. Examples of such applications are in video cassette labels and similar applications where a single label is inserted into its ultimate use location through a narrow slit.

EXAMPLES

The following examples illustrate the present invention.

Example 1

A porous, low weight, inexpensive paper substrate for use in forming a label laminate in accordance with the present invention was obtained from Rhinelander Paper Corp. of Rhinelander, Wis., under the designation of MC RHI-liner 521. This paper is believed to be formed in the following manner: A paper pulp having a hardwood/softwood fiber ratio of about 40/60 was subjected to only light refining such that the formed paper web, prior to pressing, exhibited a high degree of freeness. After pressing and drying, the paper was surface sized with a mixture of polyvinyl alcohol and clay and then was subjected to machine calendering, e.g. calendering at a moderate to low pressure through a single nip. The paper so obtained was then wound up on a suitable take-up roll to produce the novel paper substrate or backing of the present invention, without the need for subsequent supercalendering or clay coating.

A sample of the above paper substrate was subjected to the various tests described above. The following results were obtained:

| | |
|---|---|
| Water Cobb Size Test | 23 gm/m$^2$ |
| Neenah Hygroexpansivity | 2% |
| IGT Silicone Demand at 40 kg, | 5–6 cm$^3$/cm$^2$ |

-continued

| | |
|---|---|
| IGT Penetration | 8 cm |
| Coefficient of Backside Friction | 0.5–0.6 |
| Liner Stiffness, | |
| Machine Direction | 150 mg |
| Transverse Direction | 90 mg |
| Caliper | 2.75 mils |
| Apparent Density | 12.7 lbs/mil/ream |
| Deflection | 10% |
| Tensile Stiffness Orientation | 2% |
| Heat Stability | 0.5% |
| Contact Angle | 120 degrees |
| Parker Print Surface | $6\mu$ |
| Squareness (MD/TD Ratio) | 1.4 |
| % Elongation under stress, machine dir. | 2% |
| Tensile Energy Absorption, | |
| machine direction | 4.5–6 kg · m/m$^2$ |
| cross direction | 12–15 kg · m/m$^2$ |

A series of release liners was made by coating multiple samples of the above paper product with 1.0–1.3 grams per square meter of a release agent comprising dimethylsiloxane polymer intermixed with a conventional catalyst, inhibitor and other conventional components such as a cross-linking agent and a controlled release additive. The release agent was allowed to dry and cure, thereby producing the release liner of the present invention. Upon analysis, it was found that these release liners consistently exhibited a Percent Extractables by the test described above of about 2%.

The above release liners were then formed into label laminates of the present invention by coating with an adhesive comprising an emulsion-based acrylic polymer mixture and then laminating a facestock layer composed of laser label paper on the adhesive. Prior to lamination, it was determined that the slope of the hysterisis curve of the paper backing was 1.25, while the slope of the hysterisis curve of the facestock was 1.2. Thus, the slopes of the two hysterisis curves were within 0.05% of one another, indicating a substantial match.

The Stiffness of the laminates produced in this manner was determined by the above Laminate Stiffness test to be 600 mg in the machine direction and 400 mg in the transverse direction. In addition, the laminates were subjected to a wide variety of tests to verify performance, including silicone coverage (determined through the use of certain dye stains such as malachite green to visually measure coverage on the inventive release liner, as well as electronically measure coverage by the depth of color of the stain) and release force (Tag and Label Manufacturers Institute test method TLMI release). Release force was measured between 50 and 100 grams during the experimentation, dependent upon process conditions, selection of adhesion and silicone system, and facestock used. The laminates were then converted into labels using a common label making press from Mark Andy Corporation. In this operation, the inventive liners exhibited an ability to convert into labels without failures at speeds up to 1000 feet per minute, with minimal compressibility experienced using dies tooled for 2.5 mil liners. Samples were sheeted and subject to curl testing at a variety of humidities ranging between 25% and 75% RH. Curl was measured as less than ¼" under all conditions on 8.5"×11" samples. Die-cut and uncut sheets were then evaluated in a variety of end use applications, including ink jet printers, desktop laser printers, and high speed industrial printers, with very little jamming or curl noted, and minimal post-printer curl. The product laminates exhibited a strong tendency to relax after printing, and return to a lay flat condition.

Example 2

Example 1 was repeated except that it is believed in making the paper substrate alum and rosin were included in the paper pulp as an internal size, the paper slurry was subjected to only very light refining, and the completed paper was subjected to no calendering at all prior to winding on the take-up roll. Also, in making the release liner from this paper substrate, the silicone release agent was composed of the system illustrated in commonly assigned U.S. Pat. No. 5,165,976, the disclosure of which is incorporated herein by reference.

The paper substrate, the release liner and the product label laminate made in this manner were subjected to the same battery of tests as in Example 1. The following results were obtained.

| | |
|---|---|
| Water Cobb Size Test | 22–23 gm/m$^2$ |
| Neenah Hygroexpansivity | 1.5% |
| IGT Silicone Demand at 40 kg, cm$^3$/cm$^2$ | 5–6 cm$^3$/cm$^2$ |
| IGT Penetration | 8 cm |
| Coefficient of Backside Friction | 0.5–0.6 |
| Liner Stiffness | |
| Machine Direction | 125 mg |
| Transverse Direction | 0.5 mg |
| Caliper | 2.80 mils |
| Apparent Density | 14 lbs/mil/ream |
| Deflection | 10% |
| Tensile Stiffness Orientation | 2% |
| Heat Stability | 0.5% |
| Contact Angle | 120° |
| Parker Print surface | $6\mu$ |
| Squareness (MD/TD Ratio) | 1.5 |
| % Elongation under stress, machine dir. | 1.6% |
| Tensile Energy Absorption, kg · m/m$^2$ | 4.5–5.5% |
| Percent Extractables | 5–7% |
| Laminate Stiffness | |
| machine direction | 600 mg |
| transverse direction | 400 mg |

Samples of the above paper product described above were coated with 1.0–2.0 grams/square meter of a release agent comprising of a silicone polymer intermixed with 20 to 50 wt. % styrene-butadiene rubber. The release agent was allowed to dry and cure during the pressure-sensitive coating and laminating operation, thereby producing release liners of the present invention. Upon analysis, it was found that these release liners exhibited a Percent Extractables by the test described above between 4% and 15%, depending upon selection of the release agent and the process conditions used to apply and dry the release agent.

The above liners were formed into label laminates of the present invention by coating with an adhesive comprising an emulsion-based acrylic polymer blend and then laminating a variety of facestocks used for laser and similar electronic printing techniques. Prior to lamination, it was found that the slope of the hysterisis curve of the paper backing was 1.25, while the slope of the facestock curves was 1.2–1.3. Thus the slope of the curves matched within 5%. As in Example 1, the resulting laminates were subjected to a variety of internal lab tests to determine laminate properties, with no loss of adhesion noted, as well as stable release (50–110) grams dependent upon facestock and process conditions. As in Example 1, printer testing was very positive, with no jamming or print failures noted.

Although only a few embodiments of the present invention have been described above, it should be appreciated that many modifications can be made without departing from the spirit and scope of the invention. For example, although the foregoing description indicates that the inventive label laminate can be made without the supercalendering, soft nip calendering and heavy clay coating steps used in prior art systems, these techniques can nonetheless be used in the practice of the present invention in addition to the chemical techniques described above for accomplishing the desired silicone cure and silicone holdout characteristics or otherwise producing paper substrates, release liners and label laminates of improved properties. All such modifications are intended to be included within the scope of the present invention, which is to be limited only by the following claims.

We claim:

1. A label laminate comprising a release liner and a label layer thereon, said label layer comprising a paper facestock and an adhesive bonding said facestock to said release liner, said release liner comprising a paper substrate and a layer of a release agent between said substrate and said adhesive, the slope of the Neenah Hygroexpansivity hysterisis curve of the paper forming said substrate substantially matching the slope of the Neenah Hygroexpansivity hysterisis curve of the paper forming said facestock, the paper forming said substrate having a basis weight of 50 pounds per 3000 ft$^2$ ream or less, wherein the paper forming said substrate has an IGT Silicone Demand at 40 kg of <6 cm$^3$/cm$^2$ and a Heat Stability of <0.5%, the cured silicone coating of said release liner exhibiting a Percent Silicone Extractables of <10%.

2. The laminate of claim 1, wherein the paper forming said substrate has a Water Cobb Size Test value of 15–27 gm/m$^2$, a Neenah Hygroscopicity of <5% and an Apparent Density of 11.5–17 lbs/mil/ream.

3. The laminate of claim 2, wherein the paper forming said substrate exhibits the following properties:

| | |
|---|---|
| Water Cobb Size Test | 20–23 gm/m$^2$ |
| Neenah Hygroscopicity | 0–2% |
| IGT Silicone Demand at 40 kg | <5.5 cm$^3$/cm$^2$ |
| Apparent Density | 12–15 lbs/mil/ream |
| Heat Stability | <0.05% | and further wherein said release agent exhibits a Percent Extractables of 3 to 6%.

4. The laminate of claim 2, wherein the paper forming said substrate exhibits the following additional properties:

| | |
|---|---|
| IGT Penetration, | 6–12 cm |
| Deflection | <15% |
| Tensile Stiffness Orientation | <5% |
| Backside Coefficient of Friction | 0.3–0.8 |
| Liner Stiffness, | |
| Machine Direction | 100–200 mg |
| Transverse Direction | 40–80 mg |
| Caliper | 2.0–4.0 mils. |

5. The laminate of claim 4, wherein the paper forming said substrate exhibits the following additional properties:

| | |
|---|---|
| IGT Penetration, | 7–10 cm |
| Deflection | <3% |
| Tensile Stiffness Orientation | <3% |
| Backside Coefficient of Friction | 0.5–0.6 |
| Liner Stiffness | |
| Machine Direction | 130–170 mg |
| Transverse Direction | 50–65 mg |
| Caliper | 2.75 ± 0.1 |

6. The laminate of claim 4, wherein the paper forming said substrate exhibits the following additional properties:

| | |
|---|---|
| Contact Angle | 90–180° |
| Parker Print Surface | >3µ |
| Squareness (MD/TD Ratio) | 3 to 1 |
| % Elongation Under Stress Machine Direction | 0.5–2% |
| Tensile Energy Absorption | 5–15 kg · m/m$^2$ |

7. The laminate of claim 6, wherein the paper forming said substrate exhibits the following additional properties:

| | |
|---|---|
| Contact Angle | 100–130° |
| Parker Print Surface | 4.0–5.5µ |
| Squareness (MD/TD Ratio) | 1.5 to 1 |
| % Elongation Under Stress machine dir. | 0.5–1% |
| Tensile Energy Absorption | 7–10 kg · m/m$^2$ |

8. The laminate of claim 2, wherein the paper forming said laminate exhibits the following properties:

| | |
|---|---|
| Water Cobb Size Test, gm/m$^2$ | 20–23 gm/m$^2$ |
| Neenah Hygroscopicity | 0–2% |
| IGT Silicone Demand at 40 kg | <5.5 cm$^3$/cm$^2$ |
| Apparent Density | 12–15 lbs/mil/ream |
| Heat Stability | <0.05% |
| IGT Penetration, | 7–10 cm |
| Deflection | <3% |
| Tensile Stiffness Orientation | <3% |
| Backside Coefficient of Friction | 0.5–0.6 |
| Liner Stiffness | |
| Machine Direction | 130–170 mg |
| Transverse Direction | 50–65 mg |
| Caliper | 2.75 ± 0.1 |
| Contact Angle | 100–130° |
| Parker Print Surface | 4.0–5.5 |
| Squareness (MD/TD Ratio) | 1.5 to 1 |
| % Elongation Under Stress machine dir. | .5–1% |
| Tensile Energy Absorption | 7–10 kg · m/m$^2$ | and further wherein said release agent exhibits a Percent Extractables of 3 to 6%.

9. The laminate of claim 2, wherein the paper forming said substrate has a basis weight of 45 pounds per 3000 ft$^2$ ream or less.

10. The laminate of claim 9, wherein the paper forming said substrate has a basis weight of about 40 pounds per 3000 ft$^2$ ream or less.

11. The laminate of claim 2, wherein said laminate has a Stiffness of 400 to 800 mg in the machine direction and 200 to 600 in the transverse direction.

12. The laminate of claim 11, wherein said laminate has a Stiffness of 500 to 700 mg in the machine direction and 300 to 500 in the transverse direction.

13. A label laminate comprising a release liner and a label layer thereon, said label layer comprising a paper facestock and an adhesive bonding said facestock to said release liner, said release liner comprising a paper substrate and a layer of a release agent between said substrate and said adhesive, wherein the slope of the lower portion of the Neenah Hygroexpansivity hysterisis curve of the paper forming said substrate within 5% of the slope of the lower portion of the Neenah Hygroexpansivity hysterisis curve of the paper forming said facestock, the paper forming said substrate having a basis weight of 50 pounds per 3000 ft² ream or less, wherein the paper forming said substrate has an IGT Silicone Demand at 40 kg of <6 cm³/cm² and a Heat Stability of <0.5%, the cured silicone coating of said release liner exhibiting a Percent Silicone Extractables of <1 0%.

14. The label laminate of claim 2 wherein the liner is free of clay coatings.

15. The label laminate of claims 2 wherein the liner is not a super-calendared liner.

* * * * *